US012602832B2

(12) United States Patent
Akiyama

(10) Patent No.: US 12,602,832 B2
(45) Date of Patent: Apr. 14, 2026

(54) SIGNAL PROCESSING DEVICE, CONTROL CIRCUIT, STORAGE MEDIUM, AND SIGNAL PROCESSING METHOD

(71) Applicant: Mitsubishi Electric Corporation, Tokyo (JP)

(72) Inventor: Yuji Akiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 322 days.

(21) Appl. No.: 18/237,127

(22) Filed: Aug. 23, 2023

(65) Prior Publication Data

US 2023/0394709 A1      Dec. 7, 2023

Related U.S. Application Data

(63) Continuation of application No. PCT/JP2021/008198, filed on Mar. 3, 2021.

(51) Int. Cl.
    *G06T 5/10*          (2006.01)
    *G06T 7/90*          (2017.01)
(52) U.S. Cl.
    CPC ................. *G06T 7/90* (2017.01); *G06T 5/10* (2013.01); *G06T 2207/20056* (2013.01)
(58) Field of Classification Search
    CPC .... G06T 7/90; G06T 5/10; G06T 5/60; G06T 2211/441; G06T 2211/00; G06T 2207/20056
    USPC ......................................... 382/162, 279, 280
    See application file for complete search history.

(56) References Cited

U.S. PATENT DOCUMENTS

| | | | |
|---|---|---|---|
| 10,185,881 B2 | 1/2019 | Moosaei et al. | |
| 10,341,795 B2 | 7/2019 | Fraundorf et al. | |
| 10,402,667 B2 | 9/2019 | Moosaei et al. | |
| 10,614,327 B2 | 4/2020 | Moosaei et al. | |
| 2018/0152799 A1* | 5/2018 | Fraundorf ............ | H04R 29/008 |

(Continued)

FOREIGN PATENT DOCUMENTS

| | | |
|---|---|---|
| JP | 2020-149560 A | 9/2020 |

OTHER PUBLICATIONS

Extended European Search Report for European Application No. 21929028.5, dated Dec. 8, 2023.

(Continued)

*Primary Examiner* — Jamares Q Washington
(74) *Attorney, Agent, or Firm* — Birch, Stewart, Kolasch & Birch, LLP

(57) ABSTRACT

A signal processing device includes: a window function unit that performs window function processing on a Fourier transform frame cut from time-series signal data; a Fourier transform unit that transforms, into information in a frequency domain, the Fourier transform frame subjected to the window function processing; a color space conversion unit that generates spectrogram data by converting a phase angle of a complex amplitude in the frequency domain into a hue and performing conversion that associates an absolute value of the complex amplitude with brightness by mapping, the spectrogram data being defined so as to correspond to a two-dimensional plane of time and frequency; and a deep learning processing unit that detects or identifies a signal by convolutional processing and fully connected processing on the spectrogram data.

5 Claims, 5 Drawing Sheets

(56) References Cited

U.S. PATENT DOCUMENTS

2020/0293857 A1      9/2020  Nakadai et al.
2020/0334898 A1*  10/2020  Bae ........................ G06T 17/00

OTHER PUBLICATIONS

Wedekind et al., "Log Complex Color for Visual Pattern Recognition of Total Sound," Cornell Univeristy Library, arXiv:1907.09936v1, Jul. 24, 2019, 6 pages total.
Anonymous: "Color Map for Complex Numbers," Visual Quantum Mechanics, Jun. 4, 2017, XP055798306, p. 1.
Anonymous: "Mat2rgbCmplx-File Exchange-MATLAB Central," MathWorks, Sep. 5, 2015, XP093202767, pp. 1-5.
European Office Action for European Application No. 21 929 028.5, dated Sep. 13, 2024.
International Search Report (PCT/ISA/210) issued in PCT/JP2021/008198 mailed on May 18, 2021.
Notice of Reasons for Refusal Japanese Patent Application No. 2021-544249, mailed Oct. 19, 2021.

* cited by examiner

SIGNAL PROCESSING DEVICE, CONTROL CIRCUIT, STORAGE MEDIUM, AND SIGNAL PROCESSING METHOD

CROSS-REFERENCE TO RELATED APPLICATION

This application is a continuation application of International Application PCT/JP2021/008198, filed on Mar. 3, 2021, and designating the U.S., the entire contents of which are incorporated herein by reference.

BACKGROUND OF THE INVENTION

1. Field of the Invention

The present disclosure relates to a signal processing device that detects or identifies a signal, a control circuit, a storage medium, and a signal processing method.

2. Description of the Related Art

Known systems of detecting and identifying objects by deep learning from image information based on a Red-Green-Blue (RGB) color space including three components of R, G, and B. U.S. Pat. No. 10,185,881 discloses a method of detecting and identifying an object using deep learning by converting an image signal based on an RGB color space into image information based on a Hue-Saturation-Value (HSV) color space. The image information based on the HSV color space and the image information based on the RGB color space both have three degrees of freedom per pixel.

For a system that converts a time-series signal into a spectrogram and uses deep learning to detect or identify a signal on a time-frequency plane, information corresponding to one pixel is a complex number value with two degrees of freedom. In this case, the number of degrees of freedom of the information per pixel is different from that in the case of U.S. Pat. No. 10,185,881 above. As a result, the color space conversion by the conventional method disclosed in U.S. Pat. No. 10,185,881 above fails to execute appropriate processing for accurately detecting or identifying a signal. The conventional technique thus suffers from a problem of difficulty in accurately detecting or identifying a signal from spectrogram data by deep learning.

The present disclosure has been made in view of the above, and an object thereof is to provide a signal processing device capable of accurately detecting or identifying a signal from spectrogram data by deep learning.

SUMMARY OF THE INVENTION

To solve the above problem and achieve the object, a signal processing device according to the present disclosure comprises: window function circuitry to perform window function processing on a Fourier transform frame cut from time-series signal data representing image information; Fourier transform circuitry to transform, into information in a frequency domain, the Fourier transform frame subjected to the window function processing; color space conversion circuitry to generate spectrogram data by converting a phase angle of a complex amplitude in the frequency domain into a hue and performing conversion that associates an absolute value of the complex amplitude with brightness by mapping that converts a distribution point of the complex amplitude in the frequency domain into a three-color value in a color space including three color components, the spectrogram data being defined so as to correspond to a two-dimensional plane of time and frequency; and deep learning processing circuitry to detect or identify a signal by convolutional processing and fully connected processing on the spectrogram data.

DETAILED DESCRIPTION OF THE PREFERRED EMBODIMENTS

A signal processing device, a control circuit, a storage medium, and a signal processing method according to embodiments will be hereinafter described in detail with reference to the drawings.

First Embodiment

Figure 1:
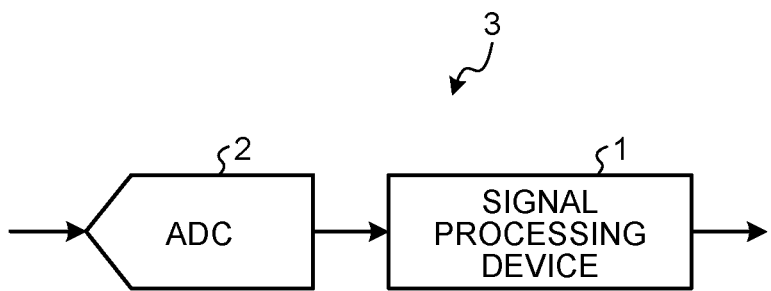
FIG. 1 is a diagram illustrating a configuration of a system including a signal processing device according to a first embodiment.

FIG. 1 is a diagram illustrating a configuration of a system 3 including a signal processing device 1 according to a first embodiment. The system 3 detects or identifies a signal from waveform data on a received signal. The system 3 includes the signal processing device 1 and an analog to digital converter (ADC) 2. The ADC 2 converts the received signal into time-series signal data by sampling the signal received by the system 3 at equal time intervals. The ADC 2 outputs the time-series signal data to the signal processing device 1. Upon receiving the time-series signal data, the signal processing device 1 performs processing for detecting or identifying a signal. The received signal is a signal representing image information. The signal processing device 1 performs detection or identification of a signal indicating an image of an object. The detection or identification of a signal refers to detecting signal-related information such as a signal type or a carrier frequency. The signal type is a type of a modulation system or a type based on a code sequence of a modulated signal.

Figure 2:
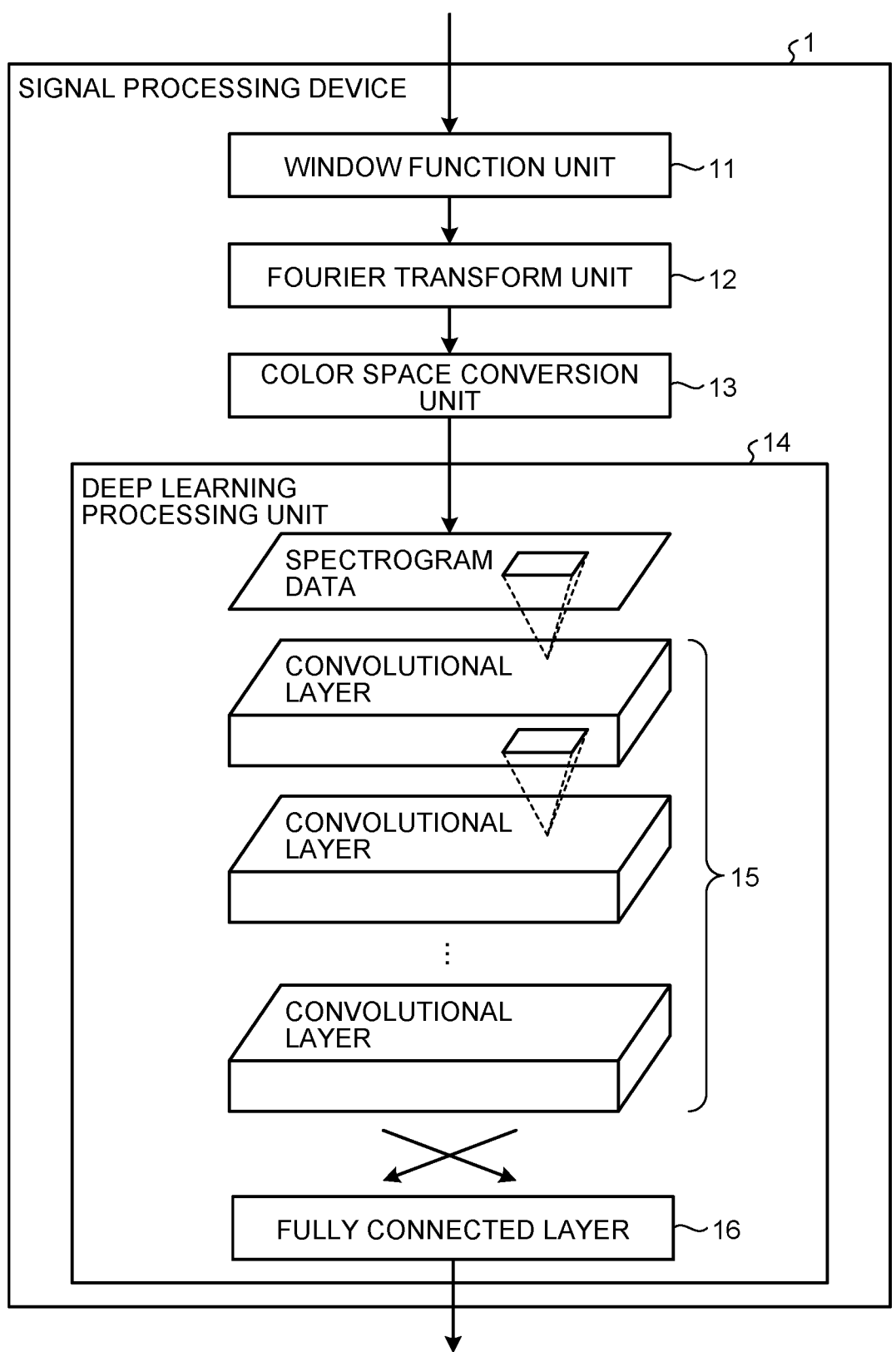
FIG. 2 is a block diagram illustrating a functional configuration of the signal processing device according to the first embodiment.

Next, a functional configuration of the signal processing device 1 will be described. FIG. 2 is a block diagram illustrating the functional configuration of the signal processing device 1 according to the first embodiment. The signal processing device 1 includes a window function unit 11, a Fourier transform unit 12, a color space conversion unit 13, and a deep learning processing unit 14.

The window function unit 11 performs processing of cutting out, from the time-series signal data, continuous time-series signals having a certain time length. This continuous time-series signals are defined as a Fourier transform frame. In cutting out the Fourier transform frame, the window function unit 11 allows the Fourier transform frame and the preceding Fourier transform frame to overlap on a time axis by 50% of each frame length and allows the Fourier transform frame and the following Fourier transform frame to overlap on a time axis by 50% of each frame length. The window function unit 11 performs window function processing on the Fourier transform frame by multiplying the Fourier transform frame by a Hann window function sequence.

The Fourier transform unit 12 applies fast Fourier transform (FFT) to the Fourier transform frame having been subjected to the window function processing, such that the Fourier transform unit 12 transforms the Fourier transform frame into information in a frequency domain.

The color space conversion unit 13 performs mapping to convert phase angles of complex amplitudes in the frequency domain into hues and also perform conversion to associates logarithms of absolute values of the complex amplitudes with brightness, thereby generating spectrogram data defined so as to correspond to a two-dimensional plane of time and frequency. The color space conversion unit 13 outputs the generated spectrogram data to the deep learning processing unit 14. Note that the two-dimensional plane of time and frequency is referred to as a time-frequency plane.

Using a weight parameter obtained by deep learning processing, the deep learning processing unit 14 to perform, on the spectrogram data, inference processing for detecting or identifying a signal. That is, the deep learning processing unit 14 executes a learning phase for detecting or identifying a signal and an inference phase for detecting or identifying a signal. Specifically, the deep learning processing unit 14 detects signal-related information, using a learning model having the weight parameter adjusted by deep learning. Such a model includes a convolutional neural network with the spectrogram data as an input and the signal-related information as an output. The convolutional neural network is a multilayer neural network, and includes a plurality of convolutional layers 15 and a fully connected layer 16. The deep learning processing unit 14 detects or identifies a signal by performing convolutional processing and fully connected processing on the spectrogram data.

The convolutional layer 15 is a layer that performs processing such as extracting information in a specific region from an image indicated by the spectrogram data. The fully connected layer 16 is a layer in which all neurons of a preceding layer and a succeeding layer are connected together. In the inference phase, the deep learning processing unit 14 performs the convolutional processing in the plurality of the convolutional layers 15 and the fully connected processing in the fully connected layer 16, and outputs information on the signal type, a value of the carrier frequency, or the like.

A conversion expression representing the color space conversion in the color space conversion unit 13 is expressed by the following expression (1).

Formula 1

$$C(r, g, b) = \frac{\log \text{abs}(Z) - \text{Min}_{\log \text{abs}(Z)}}{\text{Range}_{\log \text{abs}(Z)}} \begin{bmatrix} \frac{1}{2} & \frac{1}{4} & -\frac{\sqrt{3}}{4} \\ \frac{1}{2} & \frac{1}{4} & \frac{\sqrt{3}}{4} \\ \frac{1}{2} & -\frac{1}{2} & 0 \end{bmatrix} \begin{bmatrix} 1 \\ \cos(\arg(Z)) \\ \sin(\arg(Z)) \end{bmatrix} \quad (1)$$

As expressed above, the color space conversion unit 13 converts a phase angle of a complex amplitude "Z" into a hue and also performs conversion that associates a logarithm of an absolute value of the complex amplitude "Z" with brightness in the RGB color space. In the expression, "C (r, g, b)" represents values of the components in the RGB color space. Moreover, "abs (Z)" represents the absolute value of the complex amplitude "Z". Moreover, "arg (Z)" represents an argument of the complex amplitude "Z". That is, the "arg (Z)" represents the phase angle of the complex amplitude "Z". Moreover, "Min$_{\log \text{abs} (Z)}$" represents the minimum value that "log abs (Z)" takes. Moreover, "Range$_{\log \text{abs} (Z)}$" represents a range of the value that "log abs (Z)" takes. The spectrogram data is two-dimensional array data arranged along each of a time axis and a frequency axis. The color space conversion unit 13 performs conversion according to expression (1) on each of a plurality of complex amplitudes $Z_{ij}$ included in the spectrogram data. The subscript "i" indicates an array on the time axis. The subscript "j" indicates an array on the frequency axis.

Figure 3:
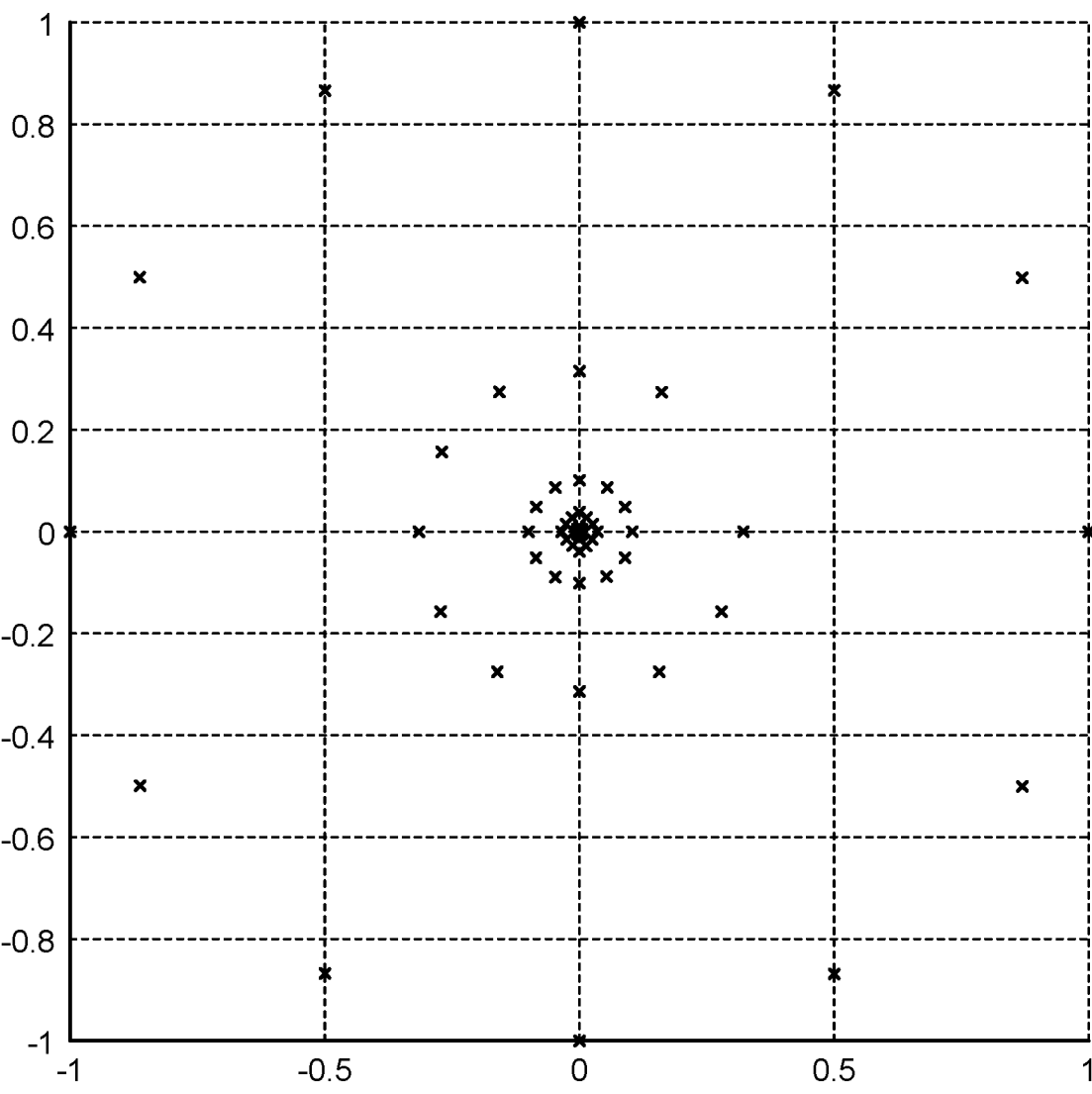
FIG. 3 is a graph illustrating how complex amplitudes are distributed on a two-dimensional complex plane in the first embodiment.
Figure 4:
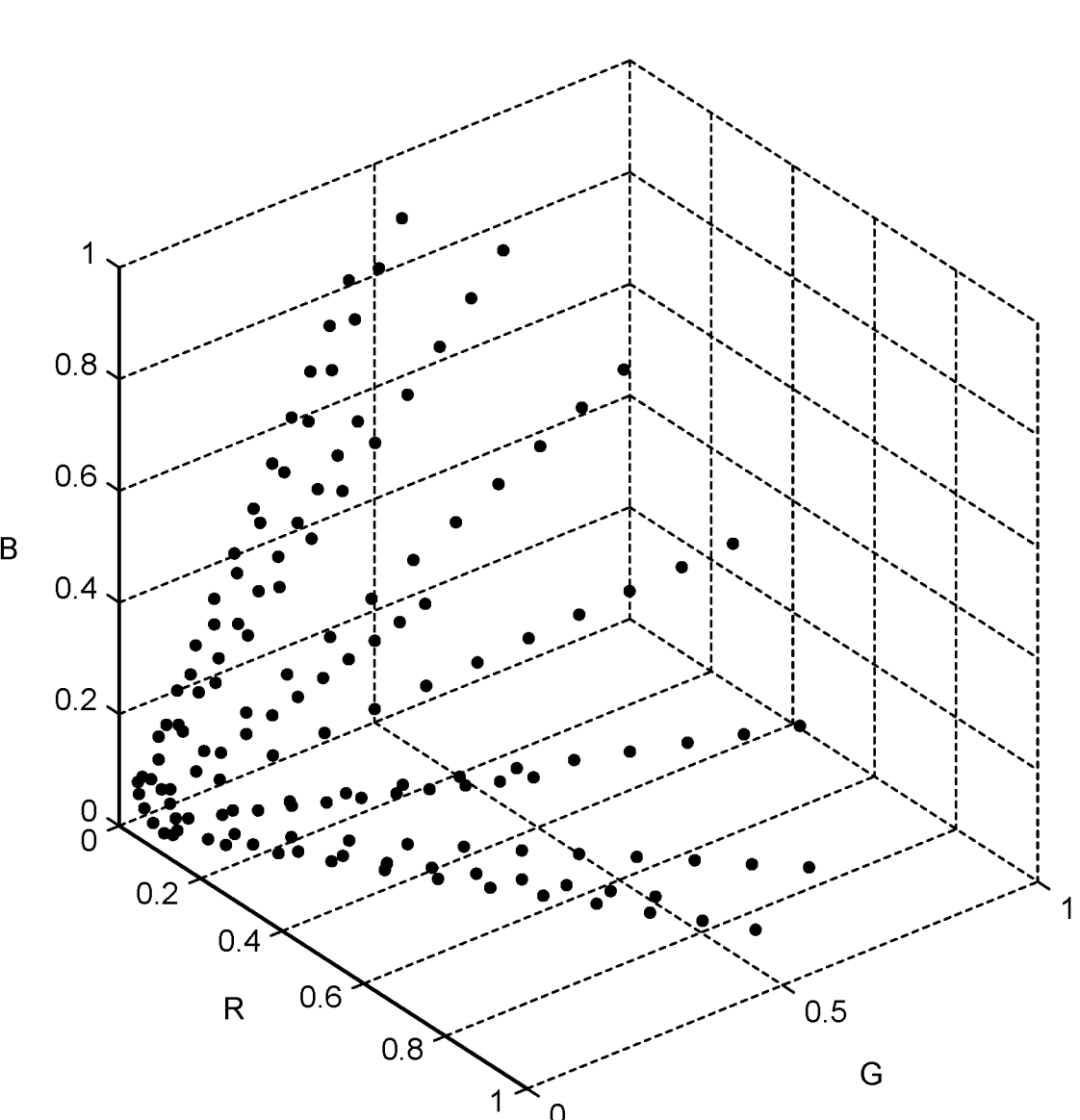
FIG. 4 is a graph illustrating how distribution points of the complex amplitudes illustrated in FIG. 3 are transferred to a three-dimensional RGB color space by mapping.

FIG. 3 is a graph illustrating how the complex amplitudes $Z_{ij}$ are distributed on a two-dimensional complex plane in the first embodiment. FIG. 4 is a graph illustrating how distribution points of the complex amplitudes $Z_{ij}$ illustrated in FIG. 3 are transferred to a three-dimensional RGB color space by mapping. In the graph illustrated in FIG. 3, the horizontal axis represents a real number axis, and the vertical axis represents an imaginary number axis. By the color space conversion expressed by expression (1), the color space conversion unit 13 converts the phase angle of each complex amplitude $Z_{ij}$ into a hue, and also performs conversion that associates the logarithm of the absolute value of each complex amplitude $Z_{ij}$ with brightness. The color space conversion unit 13 thus converts the value of each complex amplitude $Z_{ij}$ by continuous and smooth mapping. The color space conversion unit 13 outputs a value included in a standard color space domain. The color space domain is set to a range of 0≤r, g, b≤1. The color space conversion unit 13 outputs a value that can compatibly express a negative amplitude. The color space conversion unit 13 can accurately quantize the phase and the amplitude level.

Note that the window function is not limited to the Hann window function. The window function can be selected as appropriate depending on a required characteristic such as frequency resolution or dynamic range. Moreover, the overlap ratio of the Fourier transform frame does not need to be 50%, or the Fourier transform frames need not overlap. The overlap ratio and whether or not the Fourier transform frames should overlap can be determined taking into consideration a processing load, signal detection characteristics, or signal identification characteristics of the signal processing device 1. The Fourier transform is not limited to FFT. A Fourier transform in which the frame length of the Fourier transform frame is not a value of a power of two may be applied.

Reliability information may be added to the signal type information that is output. The signal types may be hierarchized, and the reliability information may be added for each hierarchy. The hierarchization of the signal types means that, for example, when binary phase shift keying (BPSK), quaternary phase shift keying (QPSK), and 8 phase shift keying (8PSK) are set as lower signal types, a signal type including all the lower signal types such as phase shift keying (PSK) is set as a higher signal type. While the higher signal type generally corresponds to broader classification of the signal types than the lower signal types, the higher signal type has an advantage that higher reliability can be obtained.

Next, the learning phase will be described. With the learning model having the weight parameter adjusted by the deep learning processing using a color image corresponding to general human vision, the deep learning processing unit 14 further performs learning with the spectrogram data having been subjected to the color space conversion described above and a label representing the signal type or a position on the time-frequency plane. The spectrogram data is learning data. The label is added to the learning data. The deep learning processing unit 14 can efficiently improve the accuracy of detecting or identifying a signal by such learning.

A machine learning model such as YOLOv3 or YOLOv4 used for object detection may be used as the learning model having been trained using the color image. Darknet-53 may be used as the convolutional layer 15.

The learning data and the label may be obtained by adding a label to real data collected in the real world, or may be data and a label generated by simulation. Alternatively, the learning data and the label may be obtained by adding a label to data obtained by processing real data.

In the case where the learning data and the label are generated by simulation, or where the label is added to the learning data obtained by processing the real data, the deep learning processing unit 14 may perform learning by variously changing a combination of a signal-noise (SN) ratio, signal power, a carrier frequency, a signal band, a carrier phase, a modulation system, a symbol rate, a symbol phase, a pulse period, a pulse duty, a pulse phase, a chirp rate, a fading effect, etc. of a signal. As a result, the signal processing device 1 can improve the accuracy of detecting or identifying a signal.

In a conventional library or package used in deep learning for object detection or identification, learning and inference have been performed using three-color values such as RGB values based on human vision or monochrome values. The three-color values have three degrees of freedom. The monochrome values have one degree of freedom. In a case where a value of a complex number having two degrees of freedom is converted into a three-color value, a processing method combinable with a conventional deep learning library or the like for accurately detecting or identifying a signal has been uncertain. For example, when an in-phase (I) value that is a value on a real number axis and a quadrature-phase (Q) value that is a value on an imaginary number axis in a complex plane are simply substituted into corresponding R and G values, the values take negative values, so that appropriate processing cannot be performed. Alternatively, in a case of application of an offset or processing such as taking a logarithm to make the values of "I" and "Q" fall within a range of $0 \leq r, g \leq 1$, which is a domain of a first quadrant in a two-dimensional plane of R and G, the hue and brightness change simultaneously every time the phase of the complex number changes. Since humans use vision to perform recognition based on brightness, it is not appropriate that the brightness changes every time the phase of a signal received asynchronously changes.

On the other hand, the signal processing device 1 according to the first embodiment performs mapping of the complex plane onto a conical surface of the RGB space. The signal processing device 1 can convert the value of the complex amplitude by continuous and smooth mapping without changing the brightness even when the phase of the complex number changes. The signal processing device 1 can keep each of the amount of information and the characteristics of the original spectrogram data by symmetric conversion between the complex number and the three-color value. As a result, the signal processing device 1 can obtain good detection accuracy and good identification accuracy when combined with deep learning based on human vision.

According to the first embodiment, the signal processing device 1 converts the phase angles of the complex amplitudes in the frequency domain into the hues and also performs conversion that associates the absolute values of the complex amplitudes with the brightness, thereby generating the spectrogram data defined so as to correspond to the time-frequency plane. The signal processing device 1 thus has the effect of accurately detecting or identifying a signal from the spectrogram data by deep learning.

Second Embodiment

As expressed by expression (1), the first embodiment has illustrated the example of mapping that converts the phase angle of the complex amplitude "Z" into the hue and also performs conversion that associates the logarithm of the absolute value of the complex amplitude "Z" with the brightness in the RGB color space. In a second embodiment, instead of converting the absolute value of the complex amplitude "Z" into the logarithm, the color space conversion unit 13 may apply a simple conversion calculation method such as keeping the absolute value of the complex amplitude "Z" linear or applying a function that gradually decreases a slope of the absolute value of the complex amplitude "Z". The color space conversion unit 13 can use any method to perform the conversion that associates the absolute value of the complex amplitude with the brightness. The color space conversion unit 13 can improve the efficiency of the calculation by applying the simple conversion calculation method. According to the second embodiment, the signal processing device 1 has an effect of being able to detect or identify a signal more efficiently than the case of the first embodiment.

Third Embodiment

As expressed by expression (1), the first and second embodiments have illustrated the example of mapping that converts the phase angle of the complex amplitude "Z" into the hue in the RGB color space. In a third embodiment, the conversion expression expressed by expression (1) may be adjusted so as to increase the maximum value of the brightness while decreasing the saturation. As a result, the color space conversion unit 13 can quantize the absolute value of the complex amplitude "Z" with higher accuracy.

The third embodiment performs color space conversion that enables quantization of the absolute value of the complex amplitude "Z" with higher accuracy. The signal processing device 1 has an effect of detecting or identifying a signal with higher accuracy than in the case of the first or second embodiment, depending on a condition of the signal to be detected or identified such as having a high dynamic range.

Next, hardware for implementing the signal processing device 1 according to the first to third embodiments will be described. The signal processing device 1 can be implemented by hardware having a configuration illustrated in FIG. 5 or 6.

Figure 5:
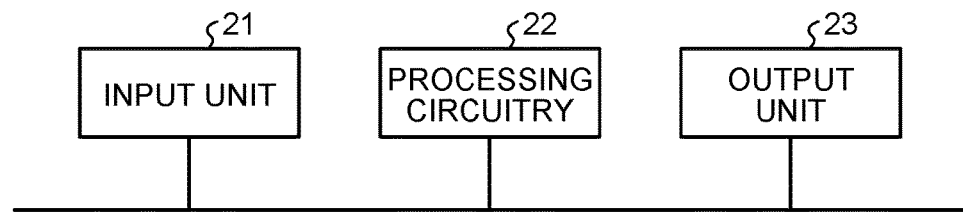
FIG. 5 is a diagram illustrating a first configuration example of hardware for implementing the signal processing device according to the first to third embodiments.

FIG. 5 is a diagram illustrating a first configuration example of the hardware for implementing the signal processing device 1 according to the first to third embodiments. FIG. 5 illustrates a configuration in a case where the main part of the signal processing device 1, that is, each of the window function unit 11, the Fourier transform unit 12, the color space conversion unit 13, and the deep learning processing unit 14, is implemented by processing circuitry 22 that is dedicated hardware. The processing circuitry 22 is, for example, an application specific integrated circuit (ASIC), a field programmable gate array (FPGA), or a circuit obtained by a combination thereof. Note that, in the example illustrated in FIG. 5, the window function unit 11, the Fourier transform unit 12, the color space conversion unit 13, and the deep learning processing unit 14 are implemented by the single processing circuitry 22, but the present disclosure is not limited thereto. The hardware may include a plurality of pieces of the processing circuitry 22 to implement the window function unit 11, the Fourier transform unit 12, the color space conversion unit 13, and the deep learning processing unit 14 by different pieces of the processing circuitry 22.

An input unit 21 is a circuit that receives an input signal to the signal processing device 1, that is, time-series signal data thereto, from the outside. An output unit 23 is a circuit that outputs a signal generated by the signal processing device 1, that is, a result of signal detection or identification, to the outside.

Figure 6:
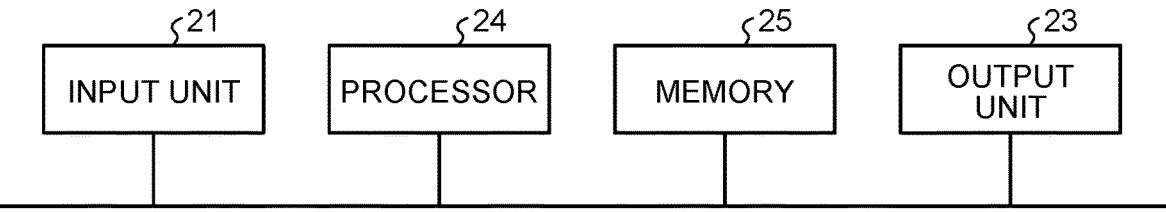
FIG. 6 is a diagram illustrating a second configuration example of the hardware for implementing the signal processing device according to the first to third embodiments.

FIG. 6 is a diagram illustrating a second configuration example of the hardware for implementing the signal processing device 1 according to the first to third embodiments. FIG. 6 illustrates a configuration in a case where the function of the processing circuitry 22 illustrated in FIG. 5 is implemented by a control circuit including a processor 24 and a memory 25. The processor 24 is a central processing unit (CPU). The processor 24 may be an arithmetic unit, a microprocessor, a microcomputer, or a digital signal processor (DSP). The memory 25 is, for example, a non-volatile or volatile memory such as a random access memory (RAM), a read only memory (ROM), a flash memory, an erasable programmable read only memory (EPROM), or an electrically erasable programmable read only memory (EEPROM (registered trademark)).

In a case where the main part of the signal processing device 1 is implemented by the processor 24 and the memory 25, the processor 24 executes a program describing processing that allows the processor 24 to operate as the window function unit 11, the Fourier transform unit 12, the color space conversion unit 13, and the deep learning processing unit 14. Such a program is stored in advance in the memory 25. The processor 24 reads and executes the program stored in the memory 25 to operate as the window function unit 11, the Fourier transform unit 12, the color space conversion unit 13, and the deep learning processing unit 14.

Note that some of the window function unit 11, the Fourier transform unit 12, the color space conversion unit 13, and the deep learning processing unit 14 may be implemented by the processor 24 and the memory 25, and the rest may be implemented by dedicated hardware similar to the processing circuitry 22 illustrated in FIG. 5.

Note that the program to be executed by the processor 24 is not limited to the program stored in advance in the memory 25. The program to be executed by the processor 24 may be a program stored in a storage medium that can be read by a computer system. The program stored in the storage medium may be stored in the memory 25. The storage medium may be a portable storage medium being a flexible disk, or may be a flash memory being a semiconductor memory. The program may be installed on the signal processing device 1 from another computer or a server device via a communication network.

The signal processing device according to the present disclosure has an effect of accurately detecting or identifying a signal from the spectrogram data by deep learning.

The configurations illustrated in the above embodiments illustrate an example of the content of the present disclosure. The configurations of the embodiments can be combined with another known technique. The configurations of the embodiments may be combined together as appropriate. A part of the configurations of the embodiments can be omitted or modified without departing from the scope of the present disclosure.

What is claimed is:

1. A signal processing device comprising:
   window function circuitry to perform window function processing on a Fourier transform frame cut from time-series signal data representing image information;
   Fourier transform circuitry to transform, into information in a frequency domain, the Fourier transform frame subjected to the window function processing;
   color space conversion circuitry to generate spectrogram data by converting a phase angle of a complex amplitude in the frequency domain into a hue and performing conversion that associates an absolute value of the complex amplitude with brightness by mapping that converts a distribution point of the complex amplitude in the frequency domain into a three-color value in a color space including three color components, the spectrogram data being defined so as to correspond to a two-dimensional plane of time and frequency; and
   deep learning processing circuitry to detect or identify a signal by convolutional processing and fully connected processing on the spectrogram data,
   wherein, in the conversion that associates the absolute value of the complex amplitude with the brightness, the color space conversion circuitry applies a function that gradually decreases a slope of the absolute value of the complex amplitude.

2. The signal processing device according to claim 1, wherein the color space conversion circuitry performs conversion that associates a logarithm of the absolute value of the complex amplitude with the brightness.

3. A control circuit to control a signal processing device, the control circuit causing the signal processing device to execute:
   performing window function processing on a Fourier transform frame cut from time-series signal data representing image information;
   transforming, into information in a frequency domain, the Fourier transform frame subjected to the window function processing;
   generating spectrogram data by converting a phase angle of a complex amplitude in the frequency domain into a hue and performing conversion that associates an absolute value of the complex amplitude with brightness by mapping that converts a distribution point of the complex amplitude in the frequency domain into a three-color value in a color space including three color components, the spectrogram data being defined so as to correspond to a two-dimensional plane of time and frequency; and
   performing processing to detect or identify a signal by convolutional processing and fully connected processing on the spectrogram data,
   wherein, in the conversion that associates the absolute value of the complex amplitude with the brightness, the generating spectrogram data includes applying a function that gradually decreases a slope of the absolute value of the complex amplitude.

4. A non-transitory storage medium to store a program for controlling a signal processing device, wherein the program causes the signal processing device to execute:

performing window function processing on a Fourier transform frame cut from time-series signal data representing image information;

transforming, into information in a frequency domain, the Fourier transform frame subjected to the window function processing;

generating spectrogram data by converting a phase angle of a complex amplitude in the frequency domain into a hue and performing conversion that associates an absolute value of the complex amplitude with brightness by mapping that converts a distribution point of the complex amplitude in the frequency domain into a three-color value in a color space including three color components, the spectrogram data being defined so as to correspond to a two-dimensional plane of time and frequency; and performing processing to detect or identify a signal by convolutional processing and fully connected processing on the spectrogram data, wherein, in the conversion that associates the absolute value of the complex amplitude with the brightness, the generating spectrogram data includes applying a function that gradually decreases a slope of the absolute value of the complex amplitude.

5. A signal processing method to be executed by a signal processing device, the signal processing method comprising:

performing window function processing on a Fourier transform frame cut from time-series signal data representing image information;

transforming, into information in a frequency domain, the Fourier transform frame subjected to the window function processing;

generating spectrogram data by converting a phase angle of a complex amplitude in the frequency domain into a hue and performing conversion that associates an absolute value of the complex amplitude with brightness by mapping that converts a distribution point of the complex amplitude in the frequency domain into a three-color value in a color space including three color components, the spectrogram data being defined so as to correspond to a two-dimensional plane of time and frequency; and performing processing to detect or identify a signal by convolutional processing and fully connected processing on the spectrogram data, wherein, in the conversion that associates the absolute value of the complex amplitude with the brightness, the generating spectrogram data includes applying a function that gradually decreases a slope of the absolute value of the complex amplitude.

* * * * *